United States Patent [19]

Marcatili et al.

[11] 4,176,911
[45] Dec. 4, 1979

[54] GRADED INDEX OPTICAL FIBER

[75] Inventors: Enrique A. J. Marcatili, Rumson; Dietrich Marcuse, Lincroft, both of N.J.

[73] Assignee: Bell Telephone Laboratories, Incorporated, Murray Hill, N.J.

[21] Appl. No.: 681,238

[22] Filed: Apr. 28, 1976

[51] Int. Cl.² .............................................. G02B 5/14
[52] U.S. Cl. ............................ 350/96.31; 350/96.30; 350/96.33
[58] Field of Search ............................ 350/96.30, 96.31

[56] References Cited

U.S. PATENT DOCUMENTS

| 3,785,718 | 1/1974 | Gloge | 350/96 GN X |
| 3,791,806 | 2/1974 | Koizumi et al. | 350/96 GN X |
| 3,980,391 | 9/1976 | Stewart | 350/96 GN X |

OTHER PUBLICATIONS

Jacomme, Article in *Applied Optics*, Nov. 1975, pp. 2578-2584.

*Primary Examiner*—Rolf G. Hille
*Attorney, Agent, or Firm*—Bryan W. Sheffield; Burton I. Levine; Sylvan Sherman

[57] ABSTRACT

A graded index, multimode optical waveguide. The waveguide is characterized by a graded profile region, followed by an abrupt drop in index, then a region of constant index. At predetermined intervals, the fiber is modified to have a conventional graded index profile to suppress unwanted modes propagating along the guide.

8 Claims, 13 Drawing Figures

GRADED INDEX OPTICAL FIBER

BACKGROUND OF THE INVENTION a. Field of the Invention

Broadly speaking, this invention relates to waveguides. More particularly, in a preferred embodiment, this invention relates to optical waveguides in which mode mixing is deliberately encouraged with virtually no accompanying losses to radiation.

b. Discussion of the Prior Art

In recent years, considerable attention has been given to optical fibers which have parabolic or graded index profiles. Examples of such fibers are the fibers sold under the tradename "SELFOC", and the graded index fibers disclosed in U.S. Pat. No. 3,823,997, which issued on July 16, 1974 to D. C. Gloge and E. A. J. Marcatili. Graded index fibers, such as above-described, are superior in performance to more conventional, step-index fibers because all of the modes which propagate in the guide have very nearly the same group velocity; thus pulse spreading is minimized.

With respect to step-index fibers, one way to minimize the effect of pulse spreading is to deliberately encourage coupling among the various modes propagating in the guide; for example, by modulating the physical dimensions of the fiber, as taught in U.S. Pat. Nos. 3,666,348 and 3,687,514 which respectively issued on Mar. 30, 1972 and Aug. 9, 1972 to E. A. J. Marcatili, and S. E. Miller and S. D. Personick, or by modulating the refractive index of the fiber core as taught, for example, in U.S. Pat. No. 3,909,110 which issued to D. Marcuse on Sept. 30, 1975.

At first blush, it would appear that by combining both of the above techniques, that is to say, by deliberately encouraging mode coupling in a graded index fiber, one could obtain a fiber which is superior to any fiber heretofore available. Unfortunately, this did not prove to be the case in practice, because the differences between the propagation constants of neighboring modes in a graded index fiber are almost independent of the mode label, which made it very difficult to discriminate between coupling among guided modes and coupling from guided to radiation modes.

The problem, then, is to find a technique for enhancing mode conversion in a graded index fiber which does not at the same time result in increased radiation losses.

SUMMARY OF THE INVENTION

Fortunately, this problem has been solved by the instant invention which in a preferred embodiment comprises an optical fiber waveguide for guiding optical wave energy in a plurality of modes of wave propagation. The fiber is characterized by at least a first and a second discrete fiber region. The refractive index of the first fiber region has a graded profile which decreases from a maximum value on the fiber axis, while the refractive index of the second fiber region is substantially constant at a value which is less than the lowest index value in the first fiber region. Further, the index of the fiber drops substantially instantaneously to the constant value of the second region as the boundary between the first and second regions is traversed.

The invention and its mode of operation will be more fully comprehended from the following detailed description, when taken with the accompanying drawings, in which:

DETAILED DESCRIPTION OF THE INVENTION

Figure 1:
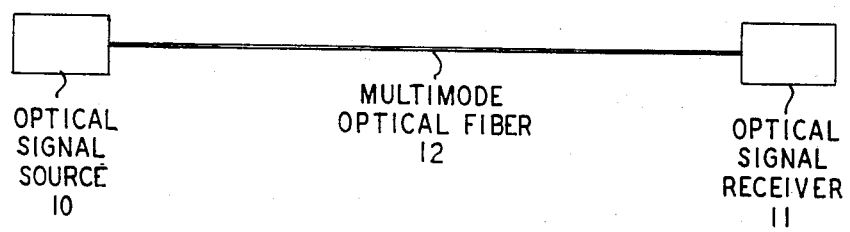
FIG. 1 is a block diagram of a typical optical communication system.

FIG. 1 depicts in block diagram form a typical optical communication system comprising an optical signal source 10, an optical signal receiver 11, and a multimode, optical fiber transmission line 12 connecting the signal source to the signal receiver.

Figure 2:
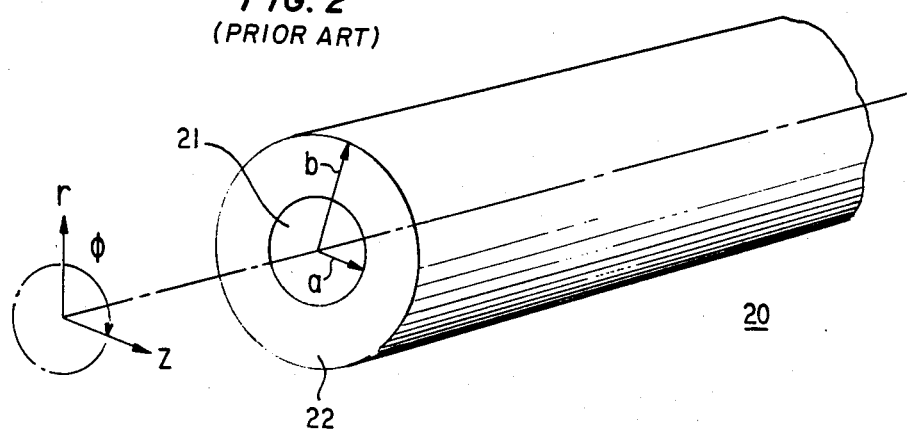
FIG. 2 is an isometric view of a portion of the optical fiber used in the system shown in FIG. 1.

The present invention relates to the transmission line portion of the system, a segment of which is shown in FIG. 2, and more particularly to means for reducing the delay distortion which is produced in a multimode optical fiber. The fiber 20 shown in FIG. 2 is a step-index fiber having a core region 21 of radius a and index $n_o$ and a cladding layer 22 of radius b and index $n_c$. As will be discussed, FIG. 2 may also be used to represent a parabolic or graded index fiber in which the index of refraction decreases radially from $n_o$ to $n_c$ according to a predetermined mathematical relationship.

As is well known, light pulses are carried in multimode optical fibers by many hundreds of modes. Such multimode operation limits the information carrying capacity of the system because of the phenomenon known as pulse spreading. At the fiber input, all modes simultaneously receive part of the energy of the incoming light pulse. However, at the fiber output the light pulse is stretched out in time because each mode, or mode group, travels with a different group velocity. The length of the stretched pulse is proportional to the fiber length and the amount of pulse spreading depends on the construction of the fiber.

The dependence of the group velocity of the modes on the mode labels is influenced by the distribution of the refractive index profile of the fiber in the radial direction. Step-index fibers, such as the fiber shown in FIG. 2, typically exhibit more pulse spreading than fibers with graded refractive index distributions. Fibers whose index profiles show a parabolic or square law dependence on the radial coordinate exhibit the property that all modes propagating in the guide have nearly the same group velocity so that pulse spreading in parabolic index fibers is very nearly minimized. See "Multimode Theory of Graded-Core Fibers" by D. Gloge and E. A. J. Marcatili, *Bell System Technical Journal*, Vol. 52, No. 9, November 1973, pp. 1563–1578.

So far we have been discussing transmission in perfect fibers, that is to say fibers wherein each mode propagates independently of all other modes. However, inhomogeneities in the axial distribution of the refractive index, or geometrical imperfections in the fiber geometry, tend to couple the modes amongst each other. Mode coupling has the undesirable consequence that some of the optical energy traversing the waveguide is coupled to unguided radiation modes, resulting in radiation losses. On the other hand, coupling of the guided modes results in a continuous interchange of power between the fast and slow modes so that a new light pulse is created whose energy is distributed over all the modes. Instead of spreading according to the differing group velocities of the independent modes, the light energy carried by the coupled modes is forced to travel at an average velocity and exhibits a narrower width than it would were the modes to remain uncoupled. Furthermore, the spreading of this new pulse is proportional to the square root of the length of the fiber rather than directly proportional to fiber length. Thus, it has now become customary to intentionally introduce mode coupling to improve the pulse performance of multimode fibers. See, for example, the commonly assigned U.S. Pat. No. 3,909,110, which issued to D. Marcuse on Sept. 30, 1975; U.S. Pat. No. 3,666,348 which issued to E. A. J. Marcatili on May 30, 1972; and U.S. Pat. No. 3,687,514 which issued to S. E. Miller et al. on Aug. 29, 1972. However, this technique must be used with great care in order to avoid an unacceptable increase in the power loss of the fiber.

Figure 3:
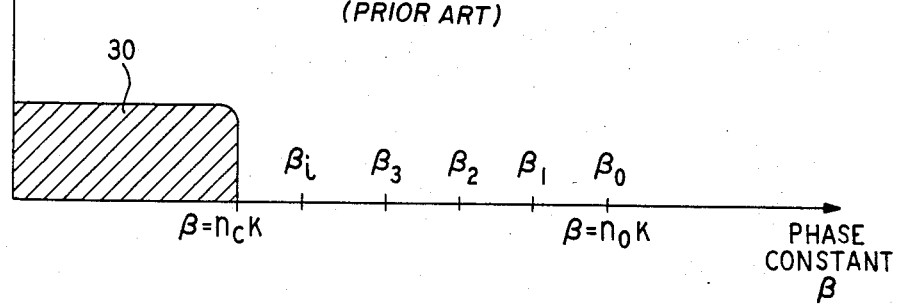
FIG. 3 is a phase constant diagram for the optical fiber shown in FIG. 2.

FIG. 3 is a phase constant diagram for the fiber shown in FIG. 2. As shown, the first guided mode has a phase constant $\beta_o = n_o k$ where $k = 2\pi/\lambda_o$ and $\lambda_o$ is the free space wavelength of the wave energy, and $\beta_i$ is the phase constant of the last guided mode which is greater than $\beta = n_c k$. Thus, any wave having a phase constant falling within the shaded area 30 will be a radiating mode and coupling into this region of the graph is obviously undesirable.

To understand how mode coupling can be tailored to minimize losses it is necessary to consider the coupling process in more detail. Now, it is known that each mode has a characteristic propagation constant $\beta_M$ where the label M is used to identify the mode. A unique mode designation actually requires that M consist of two symbols respectively representing the radial and azimuthal mode numbers. However, for simplicity we combine the double label within the single symbol M. As mentioned previously, mode coupling may be provided by establishing some deviation of the fiber from its perfect geometry and composition. See, for example, "Coupled Mode Theory of Round Optical Fibers" by D. Marcuse, *Bell System Technical Journal*, Vol. 53, No. 6, July-August 1973, pp. 817–842. Let us use a function, $f(z)$, to describe the axial dependence of the deviation of the refractive index distribution, or of the core radius deviation, from the nominal, perfect values. In addition to this function of the length coordinate z, we must employ its Fourier transform, which we define as $$F(\theta) = \left\{ \lim_{L \to \infty} \frac{1}{\sqrt{L}} \int_0^L f(z) e^{i\theta z} dz \right\} \quad (1)$$

Coupling between two modes, labeled M and N, is mediated by a particular Fourier component of $f(z)$ according to the equation $$\beta_M - \beta_N = \theta \quad (2)$$

It is thus clear that two modes remain uncoupled if $F(\theta) = 0$ for the particular $\theta$ value required by equation 2. Furthermore, if the differences between the propagation constants of neighboring guided modes depend on the mode number, $F(\theta) \neq 0$ is required over a certain range of $\theta$ values if all guided modes are to be coupled. Using these rules and certain "selection rules" it has been demonstrated that most guided modes of a step-index fiber can be coupled with very little radiation loss, if the Fourier spectrum of equation 1 is limited to a carefully selected range, such that Fourier components exist for coupling the guided modes according to equation 2 but that coupling between guided and radiating modes which also obey the equation 2 is prevented.

Mode coupling is parabolic or graded index fibers, on the other hand, requires only a narrow spectrum of spatial frequencies $\theta$ because the differences between propagation constants of neighboring modes are almost independent of the mode label. As previously mentioned, this feature of the parabolic or graded index fiber causes problems because it makes it harder to discriminate between coupling among guided modes and coupling from guided to radiating modes. With an appropriate selection rule, coupling among guided modes of a step-index fiber has the property that the differences between propagation constants of neighboring modes increase with increasing mode number. Cutting the Fourier spectrum off at a maximum spatial frequency, $\theta = \theta_{max}$, thus stops mode coupling at a given mode number, so that coupling between guided modes of lower order and modes with the highest mode numbers is prevented. Since only the highest order modes are near, in mode number space, the radiation modes, coupling between guided and radiation modes is thus avoided. Unfortunately, because of the almost constant differences between propagation constants of neighboring modes, this strategy fails in parabolic and graded index fibers.

We have discovered that one may couple the guided modes of a parabolic or graded index fiber and still avoid radiation losses by using a modified parabolic index profile.

An ideal parabolic refractive index profile has the form $$n = n_o \left[ 1 - \left( \frac{r}{a} \right)^2 \Delta \right] \quad |r| < \infty \quad (3)$$

where
$n_o$ = the maximum refractive index of the core at $r = 0$
$n_a$ = the refractive index at $r = a$
$a$ = the radius of the core $\Delta = n_o - n_a / n_o$ $r=$ the radial coordinate and $\Delta/a^2$ determines the gradient of the index profile. The true parabolic index profile cannot be realized because the refractive index of ordinary solid materials cannot be less than unity. Typical parabolic index fibers have index profiles of the form $$n = \begin{cases} n_o\left[1 - \left(\frac{r}{a}\right)^2 \Delta\right] & |r| \leq a \\ n_c = n_o(1-\Delta) & a \leq |r| \leq b \\ 1 & b \leq |r| < \infty \end{cases} \quad (4)$$

where $b=$ the cladding radius.

The cladding region $a \leq |r| \leq b$ is usually so thick that, mathematically, we may assume $b \to \infty$. The guided modes do not carry significant amounts of power inside of the cladding region so that they behave almost as if they were guided by the ideal index distribution of equation 3. Modes with significant amount of power in the cladding region are no longer guided but belong to the continuous spectrum of radiation modes. By providing a narrow Fourier spectrum of spatial frequencies for the purpose of coupling the guided modes, we necessarily couple the highest order guided modes to radiation and lose power.

We have discovered that this situation is changed if we modify the index profile to the following form $$n = \begin{cases} n_o\left[1 - \left(\frac{r}{a}\right)^2 \Delta\right] & |r| \leq a \\ n_c < n_o(1-\Delta) & a < |r| \leq \infty \end{cases} \quad (5)$$

where $b = \infty$ is assumed for simplicity.

Figure 4A:
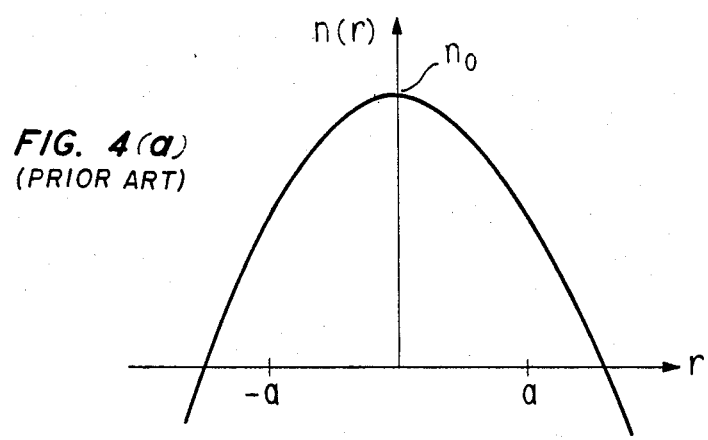
FIGS. 4(a) and 4(b) are diagrams indicating the index profile in a theoretical and an actual graded index fiber, respectively.
Figure 4B:
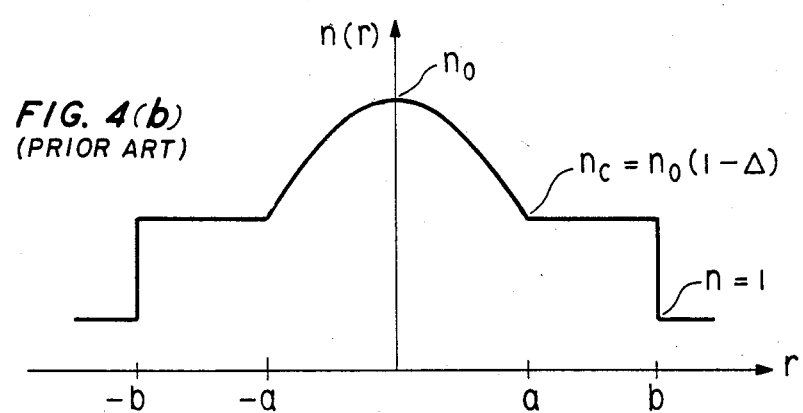

FIGS. 4(a), (b) and (c) respectively show the index profiles corresponding to equations 3, 4 and 5. We divide the guided modes of the index profile given by the equation 5, and shown in FIG. 4(c), into two classes. First, there are modes whose field distributions are essentially limited to the region $0 \leq |r| \leq a$. These modes have negligibly small field intensities in the region $|r| \geq a$ and behave as though they belonged to the idealized medium defined by equation 3. Because modes of this kind are essentially the modes of the parabolic or graded index medium, we call them P-modes. There are, in addition, modes of order higher than the P-modes whose field distributions reach strongly into the region near $r=a$. These modes are guided by the index discontinuity at $r=a$ and behave in a manner which is similar to the way the modes behave in a step index fiber. For this reason, we call these latter modes S-modes. As shown in FIG. 5, the differences between neighboring P-modes are nearly identical while the differences between S-modes are much larger and, if an additional selection rule is introduced, increase with increasing mode number. If a narrow band of spatial Fourier components is provided to couple the P-modes among each other, S-modes will remain uncoupled from P-modes and also remain uncoupled among each other. Thus, we have achieved coupling among the P-modes and have improved their pulse performance. However, if S-modes are allowed to reach the signal receiver, the pulse performance of the system would be degraded very seriously because of the different group velocities of P-modes and S-modes and the large group velocity spread among the S-modes. It is, thus, necessary to suppress S-modes before they reach the receiver. This can be readily done by adding at the end of the above described fiber another fiber section that does not allow S-modes to propagate. A fiber having an index profile according to equation 3, FIG. 4(b), has this property.

This strategy would work if there were truly no coupling between P- and S-modes. However, some residual coupling is unavoidable because of imperfect fiber tolerances. A small amount of power will always be coupled from the P-modes into the S-modes, causing a "noise" background to reach the receiver. Happily, this unwanted noise can be reduced by installing mode filters periodically along the fiber. As mentioned above, mode filters for the undesired S-modes are advantageously realized by simply providing fiber sections with an index profile according to equation 4, FIG. 4(b). If we construct a fiber whose index profile is given by equation 5, FIG. 4(c), for most of its length, but which is changed to assume the form of equation 4, FIG. 4(b), for relatively short sections periodically interspersed with the rest of the fiber, we obtain a fiber guide with built-in mode filters for S-modes. Of course, the mode filters must not be spaced too closely in order to avoid excessive losses. This additional loss occurs because we cannot avoid coupling between P-modes and a small group of S-modes that lie immediately adjacent, in mode number space, to P-modes. Along the boundary between P- and S-modes, mode spacing cannot be controlled so that we must assume that the intentionally introduced strong coupling mechanism will couple P-modes to their immediate S-mode neighbors along their common mode boundary. The mode filters strip away all S-modes, thus causing a small amount of loss of power that has been coupled to the S-mode group near the mode boundary. The design criteria for optimum mode filter spacings are given below.

Figure 6:
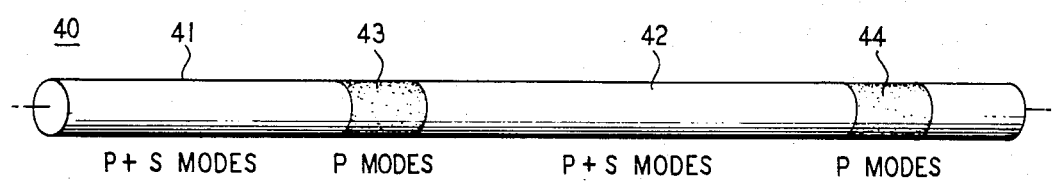
FIG. 6 is a diagram of a fiber according to the invention when modified to include periodic mode filters.

If intentional mode coupling is achieved by introducing index fluctuations into the fiber core, the mode filters can be incorporated into the fiber by the same manufacturing process that was used to produce the intentional fiber "imperfections". In the mode filter sections, no strong coupling will be provided to avoid additional losses. We shall show later that coupling can also be provided by small bends in the fiber axis. FIG. 6 illustrates a section of multimode optical fiber 40 having regions 41 and 42 where both P- and S-modes may propagate and two mode filter regions 43 and 44 where only the P-modes may propagate. To avoid cluttering the drawing, the fiber and/or index modulation which is employed to enhance mode coupling has not been shown in this view.

In the following paragraphs we provide the necessary information to explain the mechanism, and give design criteria for, a modified parabolic or graded index fiber with mode coupling.

We have previously defined what is meant by P-modes and S-modes. P-modes have field distributions that have negligibly small values at the core boundary, $r=a$, and their properties are nearly identical with the modes of the ideal, infinitely extended, square law medium. Rays may, of course, be associated with each of these modes. The rays corresponding to P-modes spiral around the fiber axis in helical paths. Axial rays cross the fiber axis and move out to a turning point where the tangent to their path is parallel to the fiber axis. Spiraling rays encounter two turning points, one near the fiber axis and the other one at larger radii. See, for example, "Propagation Effects in Optical Fibers" by D. Gloge, *IEEE Transactions on Microwave Theory and Techniques*, Vol. MTT-23, No. 1, January 1975, pp. 106–120. An approximate field description utilizes the fact that modes in weakly guiding fibers are nearly linearly polarized, at least, suitable superpositions of exact fiber modes are nearly linearly polarized. Their dominant transverse electric field component can be approximately expressed by the WKB approximation in the form $$E = A \frac{\cos\left(\psi - \frac{\pi}{4}\right) e^{-i\nu\phi} e^{-i\beta z}}{\{[(n(r)k)^2 - \beta^2]r^2 - \nu^2\}^{\frac{1}{4}}} \quad (6)$$

with $$\psi = \int_{r_1}^{r} \frac{1}{r} \{[(n(r)k)^2 - \beta^2]r^2 - \nu^2\}^{\frac{1}{2}} dr. \quad (7)$$

Where
A is an amplitude coefficient,
the integer $\nu$ is the azimuthal mode number,
$\beta$ the propagation constant and $$k = \omega(\epsilon_0 \mu_0)^{\frac{1}{2}} \quad (8)$$

the propagation constant of plane waves in free space. The inner turning point, $r_1$, is the smaller root of the equation $$[(n(r)k)^2 - \beta^2]r^2 - \nu^2 = 0. \quad (9)$$

Since the denominator of the expression in equation 6 vanishes, the WKB approximation seems to fail at the turning points. A more careful analysis (not used here) is capable of bridging the gap and extending the validity of the WKB solution across the turning points. The requirements of continuity of the field solutions across the turning points together with the requirement that the field vanish at $r = \infty$ lead to the condition $$\int_{r_1}^{r_2} \frac{1}{r} \{[(n(r)k)^2 - \beta^2]r^2 - \nu^2\}^{\frac{1}{2}} dr = (2p + 1)\frac{\pi}{2}. \quad (10)$$

The upper turning point, $r_2$, is the larger root of equation 9, and the integer p is the radial mode number. Equation 10 defines the propagation constant $\beta$ and is called the eigenvalue equation. For P-modes we have $r_2 < a$ and obtain, by substitution of equation 5 or equation 3 into equation 10, the expression $$\beta = \{n_0^2 k^2 - 2n_0(k/a)(2\Delta)^{\frac{1}{2}}(2p + \nu + 1)\}^{\frac{1}{2}}. \quad (11)$$

Now, it is apparent that S-modes will reach the core boundary and it is well known that an abrupt index change at a core boundary forces the electric field intensity to assume very low values at $r = a$. For all modes, with the exception of modes very close to cutoff, it is permissible to approximate the actual value of the electric field by letting $E = 0$ at $r = a$. This condition, in conjunction with equations 6 and 7, leads to the following eigenvalue equation for S-modes, $$\int_{r_1}^{a} \frac{1}{r} \{[(n(r)k)^2 - \beta^2]r^2 - \nu^2\}^{\frac{1}{2}} dr = (2p + \frac{3}{2})\frac{\pi}{2}. \quad (12)$$

Substitution of equation 5 and integration leads to $$[(\kappa_0 a)^2 - 2(n_0 ka)^2 \Delta - \nu^2]^{\frac{1}{2}} \quad (13)$$

$$- \nu \left[ \arctan\left( \frac{\frac{1}{2}(\kappa_0 a)^2 - \nu^2}{\nu[(\kappa_0 a)^2 - 2(n_0 ka)^2 \Delta - \nu^2]^{\frac{1}{2}}} \right) + \frac{\pi}{2} \right]$$

$$+ \frac{(\kappa_0 a)^2}{2n_0 ka(2\Delta)^{\frac{1}{2}}} \left[ \arcsin\left( \frac{(2n_0 ka)^2 \Delta - (\kappa_0 a)^2}{[(\kappa_0 a)^4 - (2n_0 ka\nu)^2 2\Delta]^{\frac{1}{2}}} \right) + \frac{\pi}{2} \right]$$

$$= \left(2p + \frac{3}{2}\right)\pi$$

with $$\kappa_0^2 = n_0^2 k^2 - \beta^2. \quad (14)$$

Figure 7:
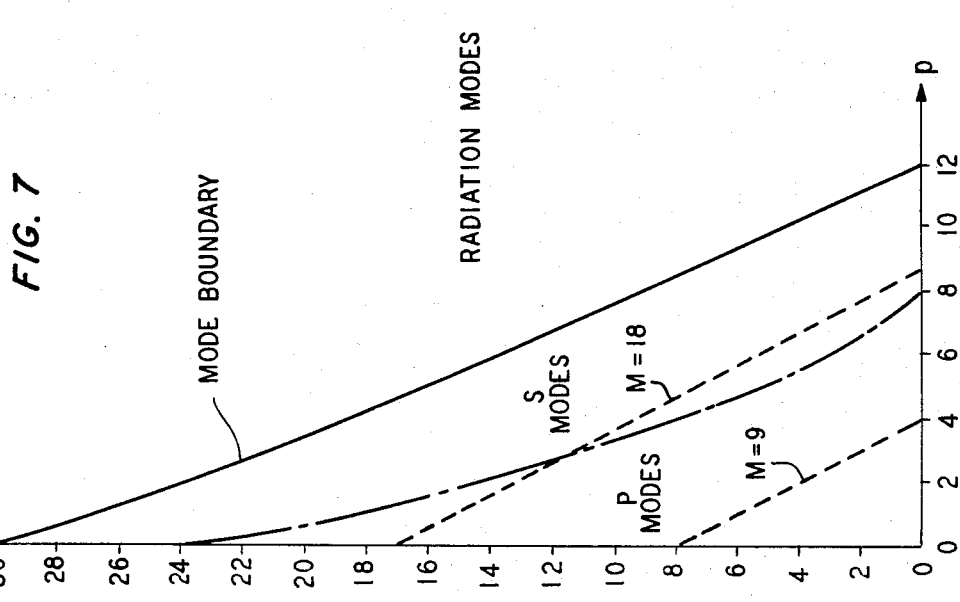
FIG. 7 is a graph showing the guided and radiation modes of the fiber of FIG. 4(c) in mode number space.

The guided and radiation modes of the modified parabolic or graded index fiber can be displayed in mode number space. Each mode is characterized by two integers, the azimuthal mode number $\nu$ and the radial mode number p. Mode number space displays of the values of $\nu$ and p in the plane are shown in FIG. 7. For P-modes we can introduce a compound mode number $$M = 2p + \nu + 1 \quad (15)$$

and express the propagation constant of equation 11 in the form, $$\beta = \left( (n_0 k)^2 - 2\frac{n_0 k}{a}(2\Delta)^{\frac{1}{2}} M \right)^{\frac{1}{2}}. \quad (16)$$

Modes with constant values of M have the same propagation constants and lie on, and parallel to, the diagonal dotted lines shown in FIG. 7. Cutoff for the S-modes is defined by the condition $$\beta = n_2 k \quad (17)$$

or $$\kappa_0 = (n_0^2 - n_2^2)^{\frac{1}{2}} k. \quad (18)$$

When we substitute equation 18 into equation 13 we obtain an implicit equation for the mode boundary between S-modes and radiation modes shown in FIG. 7 as the solid line. The boundary between P-modes and S-modes is defined by the condition of equation 16 written in the form $$(\kappa_0 a)^2 = 2n_0 ka(2\Delta)^{\frac{1}{2}} M \quad (19)$$

and from $$(\kappa_0 a)^2 = 2(n_0 ka)^2 \Delta + \nu^2. \quad (20)$$

Equation 20 expresses the requirement that the transition from P-modes to S-modes occurs when the turning point falls on the core boundary and is obtained by combining equations 5, 9 and 14 and the condition $r = r_2 = a$. By eliminating $\kappa_0 a$ from equations 19 and 20, we obtain a functional relation between $\nu$ and p which was used to calculate the dash-dotted mode boundary shown in FIG. 7. This figure was computed with the help of the following parameters, $$\left.\begin{array}{rl} n_o &= 1.53 \\ n_2 &= 1.5 \\ ka &= 150 \\ \Delta &= 0.0098 \end{array}\right\} \quad (21)$$

These values lead to the following value for the refractive index at the core boundary:

$$n_o(1-\Delta) = 1.515.$$

For the purpose of designing a coupling mechanism for the P-modes, we need to know the differences between the propagation constants of the modes. If we let $\nu$ change by $\delta\nu$ and p by $\delta p$ we compute from the eigenvalue equation for the P-modes in the form of equation 19, $$\delta\kappa_o/\kappa_o = \delta M/2M \quad (22)$$

with $$\delta M = 2\delta p + \delta \nu. \quad (23)$$

For the S-modes, we find from equation 13

$$\frac{\delta\kappa_o}{\kappa_o} = \frac{\pi(\delta p) + \frac{1}{2}(\delta\nu)\left[\arctan\left(\frac{\frac{1}{2}(\kappa_o a)^2 - \nu^2}{\nu S}\right) + \frac{\pi}{2}\right]}{\left(2p + \frac{3}{2}\right)\pi + \nu\left[\arctan\left(\frac{\frac{1}{2}(\kappa_o a)^2 - \nu^2}{\nu S}\right) + \frac{\pi}{2}\right] - S} \quad (24)$$

with the abbreviation $$S = [(\kappa_o a)^2 - 2(n_o ka)^2\Delta - \nu^2]^{\frac{1}{2}} \quad (25)$$

The difference of the propagation constants follows from equation 14:

$$\delta\beta = -(\kappa_o^2/\beta)(\delta\kappa_o/\kappa_o) \quad (26)$$

Figure 8:
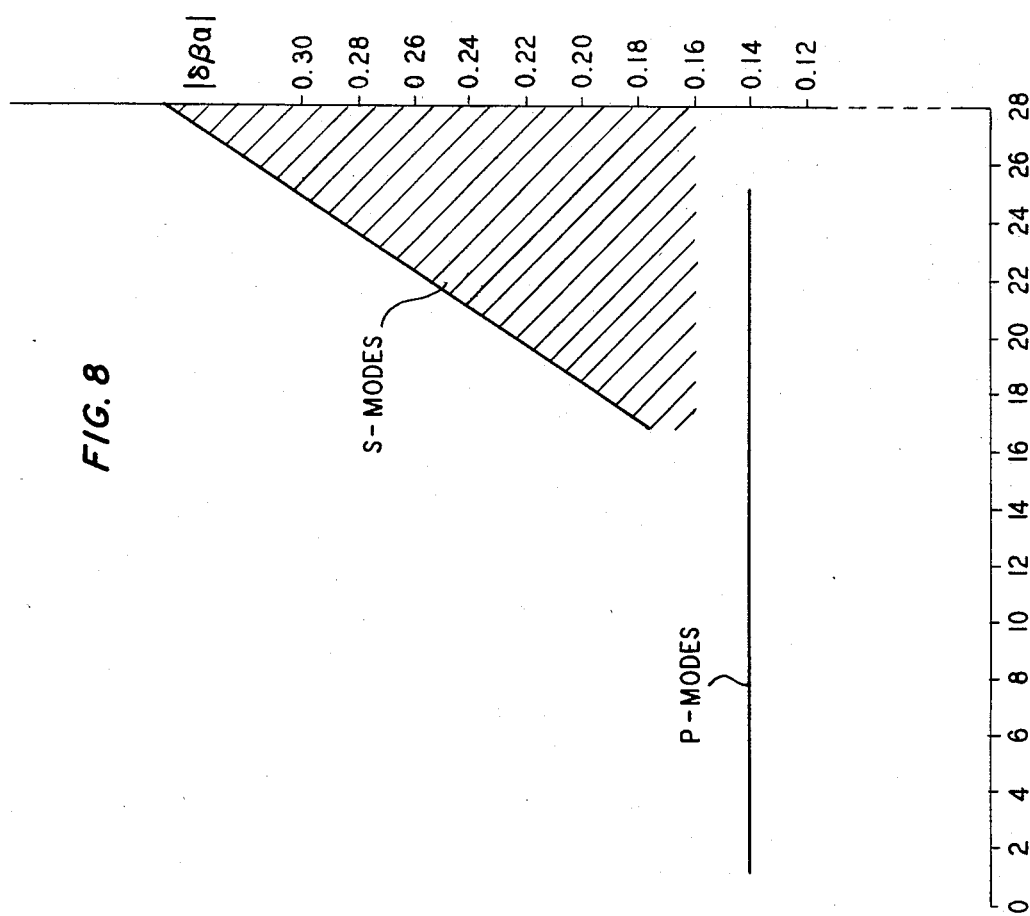
FIG. 8 is a graph showing the difference between the propagation constants, as a function of mode number, for P and S modes.

FIG. 8 is a graph on which are plotted values for $|\delta\beta a|$. These values were computed from equations 22 and 26 for P-modes and from equations 13, 24 and 26 for S-modes, using the numbers stated in equation 21. It has also been assumed that $\delta M = \pm 1$. For P-modes, $\delta M = \pm 1$ clearly yields the least separation between guided modes. ($\delta M = 0$ would lead to $\delta\beta = 0$ and is excluded). Just as in the case of the step index fiber, we introduce a selection rule by properly designing the coupling mechanism. The selection rule is $$\delta\nu = \pm 1. \quad (27)$$

We may now achieve a transition between neighboring modes with $|\delta M| = 1$ in two different ways. We can either use $$\delta\nu = \pm 1, \delta p = 0 \quad (28)$$

or $$\delta\nu = \pm 1, \delta p = \mp 1 \quad (29)$$

where the upper or lower set of signs belong together respectively. All other combinations lead to bigger values of $|\delta M|$ and larger differences for the separation between the S-modes.

FIG. 8 shows that the values of $|\delta\beta a|$ for P-modes are very nearly independent of the mode number M. By using a Fourier spectrum equation, 1, with spatial frequencies in the range $\theta a = 0.14$ to 0.1415 we couple all neighboring P-modes with $|\delta M| = \pm 1$. The hatched area in FIG. 8, labeled "S-modes", indicates the range of $|\delta\beta a|$ values that occurs for a given value of M. It is apparent how widely the differences between S-modes vary with $|\delta M| = \pm 1$. Typically, the combination in equation 28 leads to smaller $\delta\beta$ differences. However, even the smallest spacing between adjacent S-modes is so much larger than the corresponding spacing between P-modes that it was found to be relatively easy to design the coupling mechanism so that S-modes are not intentionally coupled among each other. The differences between adjacent P-modes and S-modes along the dash-dotted mode boundary in FIG. 7 cannot be calculated from our simplified theory so that we must assume that P-modes, lying along the mode boundary, may be coupled to their S-mode neighbors.

We have now proved that P-modes can be coupled among each other by a spatial Fourier spectrum of very narrow width and that it is relatively easy to discriminate between P-mode and S-mode coupling. It remains to discuss mode coupling, the degradation of pulse performance that results from coupling a few S-modes along the mode boundary to P-Modes, and the performance of the mode filters.

Inter alia, mode coupling may be provided by implanting a refractive index perturbation into the fiber core. Instead of the index distribution n given in equation 5 we now use a perturbed refractive index distribution $\bar{n}$ so that we obtain $$\bar{n}^2 - n^2 = r/a\, f(z) \cos\phi \quad |r| \leq a. \quad (30)$$

The dependence of equation 30 on $\cos\phi$ imposes the selection rule of equation 27. Without such a selection rule, we could not uncouple P-modes and S-modes. The linear r dependence indicated in equation 30 is quite arbitrary. It is necessary that equation 30 vanish at $r=0$ in order to have a well defined value of the function at this point. The linear r dependence is not only the simplest function that vanishes at $r=0$ but also one for which the coupling coefficient can be evaluated. Other r dependent functions could be used as factors in equation 30. The function f(z) is assumed to be a random function with the narrow Fourier spectrum, equation 1, that assures coupling among the P-modes but prevents coupling between P-modes and S-modes.

The system of coupled P-modes can be described by coupled power equations. The coupling coefficients are obtained by solving overlap integrals including the function of equation 30 multiplied with the electric field functions of the two modes whose coupling is to be evaluated. The P-modes are described very well by the Laguerre-Gaussian field solutions of the ideal parabolic index distribution, equation 3. We obtain for the power coupling coefficients:

$$h_{vp, v-1, p} = K(p+v) \tag{31}$$

$$h_{vp, v-1, p+1} = K(p+1) \tag{32}$$

$$h_{vp, v+1, p} = K(p+v+1) \tag{33}$$

$$h_{vp, v+1, p-1} = Kp \tag{34}$$

with $$K = \frac{k}{16\, n_0{}^3 a(2\Delta)^{\frac{1}{2}}} <F^2(\theta)> . \tag{35}$$

The symbol $<>$ indicates that an ensemble average has been taken. The argument of the Fourier spectrum function, equation 1, is the appropriate difference of the propagation constants of the coupled modes according to equation 2. (See equation 75).

It is now desired to solve the coupled power equations for the P-modes with the coupling coefficients given by equations 31 through 35. The coupling mechanism postulated by the refractive index perturbation, equation 30, couples a given mode ($v,p$) to its neighbors ($v+1, p$) ($v-1, p+1$), ($v-1, p$) and ($v+1, p-1$). In the first two cases, the M number is increased by one while it is decreased by one in the third and fourth case. The coupled power equations thus assume the form $$\frac{\partial P_{v,p}}{\partial z} + \frac{1}{v_M} \frac{\partial P_{vp}}{\partial t} + \alpha P_{vp} = \tag{36}$$

$$h_{vp,v+1,p}(P_{v+1,p} - P_{vp}) + h_{vp,v-1,p+1}(P_{v-1,p+1} - P_{vp}) +$$

$$h_{vp,v-1,p}(P_{v-1,p} - P_{vp}) + h_{vp,v+1,p-1}(P_{v+1,p-1} - P_{vp}).$$

We have indicated by our notation that the group velocity, $v_M$, depends only on the compound mode number M defined by equation 15 and not on the individual values of $v$ and p. In addition, all modes are assumed to suffer the same loss $\alpha$, caused by absorption and random scattering processes.

In order to be able to solve the equation system 36, we assume that modes with equal values of the compound mode number M carry equal amounts of power. It is not obvious that this must be the case but we may argue that modes with equal mode number M have identical propagation constants and, thus, are coupled among each other by the zero spatial frequency component of $F(\theta)$. The zero frequency components of random distortions tend to be very large. Consider, for example, the departures from perfect straightness of the fiber axis. No fiber in actual use is ever perfectly straight. In fact, its slow variations tend to be particularly large so that its power spectrum peaks at zero spatial frequencies. This fact has been observed whenever power spectra of fiber distortions have been measured. Consequently, we assume that modes with equal values of M are strongly coupled and hence equally populated by a coupling process that is not explicity taken into account. It is only incorporated into the analysis by assuming that modes with the same values of M carry equal amounts of power. Making this assumption and substituting equation 31 through equation 35 into equation 36 allows us to write, $$\left. \begin{array}{l} P_{vp} = P_M \\ P_{v+1,p} = P_{v-1,p+1} = P_{M+1} \\ P_{v-1,p} = P_{v+1,p-1} = P_{M-1} \end{array} \right\} \tag{37}$$

and $$\frac{\partial P_M}{\partial z} + \frac{1}{v_M} \frac{\partial P_M}{\partial t} + \alpha P_M \tag{38}$$
$$= K[(M+1)(P_{M+1} - P_M) - M(P_M - P_{M-1})]$$

If the number of guided modes is very large, we may regard them as a quasi-continuum and treat M approximately as a continuous variable. This assumption allows us to write the equation system 38 as a partial differential equation, $$\frac{\partial P_M}{\partial z} + \frac{1}{v_M} \frac{\partial P_M}{\partial t} = -\alpha P_M + K \frac{\partial}{\partial M}\left[ M \frac{\partial P_M}{\partial M} \right]. \tag{39}$$

Using equation 16, we can approximate the inverse group velocity in the following way $$\frac{1}{v_M} = \frac{1}{c} \frac{\partial \beta}{\partial k} = \frac{n_0}{c} + WM^2 \tag{40}$$

with the abbreviation
$$W = \Delta/n_0 c(ka)^2 \tag{41}$$

where c is the velocity of light in vacuo. We have indicated earlier that a group of S-modes along the mode boundary between P- and S-modes are coupled to the P-modes. These modes have different group velocities. We incorporate this mode group into our theory by assuming that the modes with the highest value of M, M=N, have a group velocity that differs from the law given by equation 40 for P-modes. Thus we use $$\frac{1}{v_M} = \frac{n_0}{c} + W[M^2 + \rho N^2 \delta(M-N)]. \tag{42}$$

The parameter $\rho$ is the relative amount by which the inverse velocity difference $1/v_M - n_0/c$ of the mode group with M=N differs from the normal value. If the S-modes followed by the law for the P-mode group velocity we would have for the mode group with M=N $$1/V_N = (n_0/c) + WN^2 \tag{43}$$

Equation 42 states, instead, that the highest mode group has inverse group velocity $$1/v_N = (n_0/c) + (1+\rho)WN^2 \tag{44}$$

The time dependent coupled power equations may be solved in the usual way. First, the time independent problem is solved. The only difference from the normal procedure is that in the present case we do not assume that the highest mode group is depleted by a loss process. Thus, instead of requiring $P_N = 0$ we assume that power outflow stops at M=N and require correspondingly $$(\partial P_M/\partial M) = 0 \text{ at } M = N \tag{45}$$

The time independent problem, thus, has the solution $$P_M = e^{-\alpha z} \sum_{i=0}^{\infty} c_i \frac{J_o(u_i \sqrt{M/N})}{\sqrt{N} J_o(u_1)} e^{-\sigma_i z}. \tag{46}$$

The parameters $u_i$ are the roots of the Bessel function $J_1(x)=0$ with $u_o$ define as zero, thus $$u_i = 0, 3.832, 7.016, 10.123 \tag{47}$$

The eigenvalues are $$\sigma_i = K(u^2_i/N) \tag{48}$$

with K of (35). The coefficients $c_i$ determine the initial power distribution at $z=0$. For large values of z, $P_M$ reaches its steady state solution $$P_M = (c_o/\sqrt{N})e^{-\alpha z} \tag{49}$$

which indicates that all modes carry equal amounts of power.

The time dependent steady state solution is known to represent a pulse with Gaussian shape. Its full width (in time) between 1/e points is given by second order perturbation theory and can be calculated to assume the following form:

$$T = T_o \left(1 + \frac{5\rho}{N}\right) \tag{50}$$

for $\rho=0$, we obtain the pulse width of P-modes that are completely independent of the S-modes, $$T_o = \sqrt{L} \frac{2^{1/4} n_o^{1/2} \Delta^{5/4} N^{5/2}}{kc(ka)^{3/2}(<F^2(\theta)>)^{1/2}} \tag{51}$$

where L is the length of the fiber that has been traversed by the pulse.

The pulse width spreads only proportional to the square root of the distance traveled. Equation 50 shows that the group of S-modes, that is coupled to the P-modes, widens the pulse more if its group velocity departs more from that of the P-modes, that is with increasing values of $\rho$. Its influence is reduced with increasing values of the maximum mode number N.

A comment needs to be made regarding the above analysis. We have calculated the impulse response width, equation 50, by treating the mode boundary between P- and S-modes as being parallel to the lines M=constant. FIG. 7 shows that this is not strictly true. In addition, it is not true that all S-modes along the mode boundary have equal group velocities. Our result must thus be regarded as an estimate and we must use an average group velocity for the S-modes. For M=N we use the valve that is obtained by setting $v=N/1.5$ in equations 19 and 20 and obtain, $$N = [0.573 \, n_o ka \sqrt{2\Delta}]_{int}. \tag{52}$$

The subscript "int" attached to the bracket indicates that the nearest integer to the number in brackets must be taken. The approximate mode boundary, equation 52, is shown in FIG. 7 as the dotted line labeled M=18.

If the intentionally introduced coupling were the only mechanism by which the guided modes interact we would have no further problem. However, residual coupling between all the modes is unavoidable so that we must consider the problem of power coupling from P-modes to S-modes and vice versa.

If the P-modes carry light pulses, some of their power will couple to S-modes. Since S-modes travel with different group velocities the power they receive from P-modes spreads out and forms an almost continuous background of noise power. Some of this power is coupled back into P-modes so that this noise background reaches the signal receiver even if we filter out the S-modes before they reach the end of the fiber. Periodically-spaced mode filters will reduce this noise problem but filters increase the overall losses of the system so that it is necessary to reach a compromise between excess loss due to mode filters and undesirable noise caused by unintentional S-mode coupling.

We will treat the noise problem in two stages. First, we consider the power coupling process from P-modes to S-modes and, in the next step, allow this power to couple back to the P-modes.

Consider the equation system $$\frac{\partial Q_n}{\partial z} + \frac{1}{w_n} \frac{\partial Q_n}{\partial t} = \sum_{\mu} H_{n\mu} P_{\mu} \tag{53}$$

These equations describe only coupling from P-modes to S-modes. Coupling in the reverse direction is ignored as are losses. For weak coupling in short, low-loss fiber sections this equation system is a reasonable approximation to the complete coupled power equation. $H_{n\mu}$ represents the residual, undesired coupling mechanism, the summation extends over all P-modes and the indexing system is simplified by using one symbol for the complete set of mode labels. By using a double Fourier integral transformation it is possible to derive the following solution of equation 53, $$Q_n = \tag{54}$$

$$\frac{1}{2} (\sum_{\mu} H_{n\mu} E_{\mu}) \frac{w_n v}{v - w_n} \left[ erf\left(\frac{t - z/v}{T/2}\right) - erf\left(\frac{t - z/w_n}{T/2}\right) \right]$$

which is based on the assumption that the pulses carried by the P-modes travel with a uniform velocity v (these pulses are strongly coupled by the intentional coupling mechanism), that their shape is Gaussian, that $$P_{\mu} = A_{\mu} \exp\left[-\frac{(t-z/v)^2}{(T/2)^2}\right] \tag{55}$$

with energy content $$E_{\mu} = \int_{-\infty}^{\infty} P_{\mu} dt \tag{56}$$

and that the S-modes are slower than the P-modes, $$w_n < n \text{ for all n.} \tag{57}$$

Figure 9:
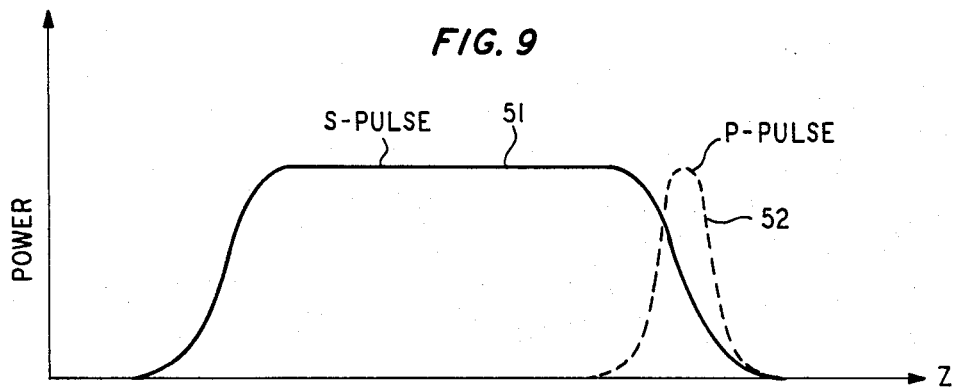
FIG. 9 is a diagram showing the energy distribution between the S and P pulses traveling in a guide having a profile according to FIG. 4(c)

The shape of the pulse carried by one S-mode is shown in FIG. 9 as the solid line 51. The shape of the P-mode pulses is indicated by the dotted line 52. The relative height of the two pulses is of no significance. The width of the S-pulse is $$\delta z = t(v - w_n) = (v - w_n) \frac{z}{w_n}. \tag{58}$$

Because the P-pulses are spaced as closely as possible, in order to maximize the information rate, we may safely assume that the S-pulses overlap after a distance z that is short compared to the total length of the fiber. The number of S-pulses that overlap at any given point is, on the average, $$M_s = \frac{\delta z}{D} = \frac{v - w_n}{w_n} \frac{z}{D} \tag{59}$$

where D indicates the spatial separation between the original P-pulses. The average power carried by a given S-mode is thus $$\overline{Q}_n = M_s Q_n = v \frac{z}{D} \Sigma_\mu H_{n\mu} E_\mu. \tag{60}$$

(The difference of the two error functions in the bracket in equation 54 assumes the value 2 over most of the region where its value does not vanish. Equation 60 can also be obtained directly from equation 53.)

We have now determined the average power in a given S-mode due to unintentional power coupling from the P-modes. We have also convincingly shown that the S-modes do not carry pulses, because of extensive pulse overlap, but carry a quasi-continuous, background noise signal.

The amount of noise power that is coupled back from S-modes into P-modes is obtained from the time independent coupled power equations $$\frac{\partial \widetilde{P}_\nu}{\partial z} = \Sigma_n H_{\nu n} \overline{Q}_n. \tag{61}$$

This equation is solved by simple integration. Summing over all modes and substituting equation 60 yields the following expression for the total noise power that is carried by all the P-modes, $$N_p = \Sigma_\nu \widetilde{P}_\nu = v \frac{z^2}{2D} \Sigma_\nu \Sigma_n \Sigma_\mu H_{\nu n} H_{n\mu} E_\mu. \tag{62}$$

Greek summation symbols are used to indicate summation over P-modes while Latin symbols express summation over S-modes.

We assume that the fiber length between mode filters is z=d. At the end of the fiber of length L we collect the noise contribution from L/d fiber sections between mode filters. The total noise is thus $$N_t = \frac{vLd}{2D} \Sigma_\nu \Sigma_\mu \Sigma_n H_{\nu n} H_{n\mu} E_\mu. \tag{63}$$

So far we have ignored absorption and scattering losses. If all modes suffer identical losses we only need to multipy equation 63 by the total loss that a signal suffers in traveling through the fiber. However, since our objective is to derive an expression for the signal-to-noise ratio, the absorption loss drops out in the end because signal and noise suffer identical losses. The average signal power at the end of the fiber is $$S = \frac{1}{T} \Sigma_\mu E_\mu. \tag{64}$$

The signal-to-noise ratio at the fiber end is therefore, $$\frac{S}{N_t} = \frac{2D}{vTLd} \frac{\Sigma_\mu E_\mu}{\Sigma_{\nu,\mu} \Sigma_n H_{\nu n} H_{n\mu} E_\mu}. \tag{65}$$

If the unintentional coupling coefficients $H_{nm}$ were known we could calculate the signal-to-noise ratio from equation 65. Equation 65 tells us that the signal-to-noise ratio improves as the spacing D between pulses is increased or the pulse width T is decreased. The signal-to-noise ratio deteriorates with increasing unintentional coupling strength; in fact, this decrease is inversely proportional to the square of the coupling strength. The signal-to-noise ratio decreases linearly with total fiber length L and with increasing fiber length d between mode filters. It is thus advantageous to space the mode filters as closely as the additional noise, that filters introduce, will allow.

For practical purposes, it will be necessary to obtain information about the unintentional mode coupling by making signal-to-noise measurements on a representative fiber sample. The signal-to-noise ratio of a fiber sample of length $L_c$ follows from equation 65 if we set $L=d=L_c$. We may use pulses of length $T_c$ for this measurement ($T_c$ or T are measured at the end of each fiber) and use a pulse spacing $D_c$ for the calibration measurement. This allows us to express the signal-to-noise ratio of a fiber with mode filters in terms of the measured signal-to-noise ratio (S/N) of a representative fiber sample, $$\frac{S}{N_t} = \frac{DT_c L_c^2}{D_c TLd} (S/N)_c. \tag{66}$$

It has priorly been explained that mode filters are required to suppress the build-up of power in the S-modes. A mode filter is simply a section of fiber without the mechanism for intentional mode coupling for P-modes, that is a section of fiber whose refractive index profile is modified from the shape of FIG. 4(c) (used for most of the fiber) to the shape of FIG. 4(b).

Mode filters introduce additional losses because the strong coupling mechanism provided for the P-mods couples these modes to a group of S-modes immediately adjacent to the common mode boundary. Let us first consider how many modes there are for a given compound mode number. If we count the number of combinations of $\nu$ and $p$ that lead to a fixed value of M defined by equation 15, we find the following expression, $$N_M = [M - 1/2]_{int} + 1 \tag{67}$$

The subscript "int" indicates in this case that the integer smaller than the number in brackets must be taken. For simplicity we use the approximation $$N_M \approx M/2. \tag{68}$$

As a further approximation we replace the mode boundary by the straight line labeled M=18 in FIG. 5. The total number of P-modes is now approximately $$N_{Tp} = \sum_{M=1}^{N} \frac{M}{2} = \frac{1}{4} N(N+1). \quad (69)$$

Because of the strong intentional coupling, each P-mode and each mode in a group of $N_N$ S-modes along the common mode boundary carries the same amount of energy. The energy reaching the $\sigma$-th fiber section is $E_{T\sigma}$. The total energy loss on the $\sigma$-th fiber section just after the mode filter is thus $$E_{T,\sigma+1} - E_{T\sigma} = \quad (70)$$

$$-\left[\frac{N_N}{N_{Tp} + N_N} e^{-2\alpha d} + (1 - e^{-2\alpha d})\right] E_{T\sigma}.$$

The symbol $\alpha$ indicates the losses caused by absorption and random scattering. We solve the difference equation and use the relation $$\sigma d = z \quad (71)$$

to obtain with the help of equation 68 (with M=N) and equation 69.

$$E_{T\sigma} = E_{To} \left[\frac{N+1}{N+3}\right]^{\sigma} e^{-2\alpha z}. \quad (72)$$

At the end of the fiber we have a total of L/d mode filter sections. The excess loss caused by the mode filters is thus $$\frac{E_{TL}}{E_{TO}} e^{2\alpha L} = \left[\frac{N+1}{N+3}\right]^{L/d} = e^{-2\alpha_f L}. \quad (73)$$

This allows us to define the approximate power loss coefficient per unit length for the excess filter loss penalty, $$2\alpha_f = \frac{2}{Nd} = \frac{3.5}{n_o k a \sqrt{2\Delta} \, d}. \quad (74)$$

Equation 52 was used to obtain the right hand side of this expression. Short fiber sections of length d between mode filters (in other words, more mode filters), thus, increase the excess loss.

In the above discussion we have outlined our technique for reducing pulse spreading in parabolic or graded index fibers. We shall now discuss specific design criteria. The most important aspect of the fiber design consists in incorporating index fluctuations into the fiber core that obey the relation of equation 30. As pointed out earlier, the r dependence of the index perturbations is not particularly important. The linear dependence was chosen for convenience. The function f(z) is a nearly periodic, random function that must contain spatial frequencies in the range $$\theta = \frac{2\pi}{\Lambda} = \frac{\sqrt{2\Delta}}{a} \rightarrow \frac{\sqrt{2\Delta}}{a} + \delta\theta \quad (75)$$

with $\delta\theta = 1.15 \, \theta\Delta$ (This formula follows from equations 2 and 26 with the help of equations 16, 18, 22 with $\delta M=1$, and equation 52.) The parameter $\Delta$ is defined by equation 3. For the numerical example given by equation 21 we find that $\Theta a$, is the fiber core radius, covers the range from 0.14 to 0.1415. To gain insight into the meaning of these numbers we assume that the invacuo wavelength of the light transmitted through the fiber is $\lambda = 1$ $\mu$m. This means that $ka = 150$ and leads to a core radius of 23.87 $\mu$m. The spatial period length of the almost periodic random function must, thus, be $\Lambda = 1.07$ mm.

Next, we must decide what amount of index fluctuation is required to achieve a desired reduction in the width of the uncoupled pulse (pulse carried by uncoupled modes). In the absence of coupling, the pulse width is given by $$T_{uc} = (n_o L/2c)\Delta^2. \quad (76)$$

The pulse width in the presence of mode coupling must be smaller than this value, otherwise steady state has not been reached and equations 50 and 51 are not applicable. First, let us consider how much harm results from coupling between P-modes and the unwanted group of S-modes along the common mode boundary. Using the valves in equation 21 we find from equation 52, N=18. Let us (arbitrarily) assume that $\rho=1$, we then find from equation 50 that the pulse width of the coupled modes is 28% larger than the width of coupled P-modes in the absence of S-mode coupling. Ignoring the slight pulse broadening effect of residual S-mode coupling, we define an improvement factor R as $$R = (T_o/T_{uc}). \quad (77)$$

It is desirable to make R as small as possible and only values with $R < 1$ are meaningful. From equations 51, 52 and 76 we get $$R = \frac{1.41 \, n_o^2 \Delta^{\frac{1}{2}}}{\left(\frac{L}{a^2} < F^2(\theta) > \right)^{\frac{1}{2}}} = \frac{0.33}{\left(\frac{L}{a^2} < F^2(\theta) > \right)^{\frac{1}{2}}}. \quad (78)$$

The numerical value on the right hand side was obtained with the help of equation 21. To achieve, for example, R=0.1 would require $$\left[\frac{L}{a^2} < F^2(\theta) > \right]^{\frac{1}{2}} = 3.3.$$

In order to understand what this result means in terms of the amplitude of the refractive index fluctuations let us consider that the function f(z) appearing in equation 30 has the form $$f(z) = A \sin(\Omega z + \Psi(z)). \quad (79)$$

Where $\Psi(z)$ is a random phase function with correlation length $D_{corr}$. The power spectrum of this function defined by equation 1 is $$\langle F^2(\theta)\rangle = A^2 \frac{\sin^2\left[(\theta-\Omega)\frac{D_{corr}}{2}\right]}{(\theta-\Omega)^2 D_{corr}}. \tag{80}$$

Instead of the correlation length $D_{corr}$ we may introduce the width $\delta\theta$ of the spectral band by the relation $$\delta\theta = (4\pi/D_{corr}). \tag{81}$$

With $\Omega = \theta$ we thus obtain from equations 80 and 81

$$\left[\frac{L}{a^2}\langle F^2(\theta)\rangle\right]^{\frac{1}{2}} = A\left(\frac{\pi}{a\delta\theta}\frac{L}{a}\right)^{\frac{1}{2}} = 3.3. \tag{82}$$

(The number on the right hand side pertains to our example.) This important relation shows how the amplitude A of the refractive index fluctuations is related to the spectral bandwidth $\delta\theta$, the core radius, and the length of fiber over which a certain improvement factor R (in our case R=0.1) is to be achieved. For our example, $\theta a$ ranges from 0.14 to 0.1415 so that we have $a\delta\theta = 0.0015$. Assuming L=1 km and using a=23.87 $\mu$m we have from equation 82, $$A = 1.1 \times 10^{-5}. \tag{83}$$

The refractive index fluctuations follow from equations 30 and 79 if we assume that $\bar{n} - n \ll 1$, (n is the perfect index distribution, equation 5)

$$\bar{n} - n = (1/2n_o)(r/a)A\sin[\theta z + \psi(z)]\cos\phi \tag{84}$$

It is apparent from equation 83 that very slight index fluctuations are very effective for intentional mode coupling. Much more substantial pulse length shortening than R=0.1 should thus be easily achievable. The random phase fluctuations with correlation length $D_{corr}$ can be produced by keeping the phase $\psi(z)$ of equation 79 constant over a fixed distance and introducing a random phase jump periodically in length intervals $D_{corr}$. The relation between $D_{corr}$ and the desired bandwidth of the random function is given by equations 81 and 75.

So far we have not discussed how best to implement the refractive index fluctuations prescribed by equations 30 or 84. In principle, it is possible to introduce the refractive index fluctuation during the process of fiber preform fabrication since it is necessary to employ special processing procedure to produce the parabolic index profile in any event. It is thus possible to produce the intentional deviations from the perfect parabolic or graded index profile in the core by programming the chemical vapor deposition process, or whatever other process may be used to produce the desired refractive index profile. However, there is an alternative way of realizing a refractive index fluctuation of the kind required by equation 30 which may be more advantageous under some circumstances. Let us write the index profile inside the fiber core in cartesian coordinates $$n = n_o\left[1 - \frac{x^2 + y^2}{a^2}\Delta\right]. \tag{85}$$

If we displace the index profile in the x direction from its symmetric position we may make the substitution $$x \rightarrow x - g$$

Assuming the displacement, g, to be small, we obtain instead of equation 85, $$\bar{n} = n + 2n_o(xg/a^2)\Delta \tag{86}$$

with n once more given by equation 85. By transforming the cartesian coordinates to cylindrical coordinates using, $$x = r\cos\phi \tag{87}$$

we obtain, $$\bar{n}^2 - n^2 \approx 2n_o(\bar{n} - n) = \frac{r}{a}(4n_o^2 g\frac{\Delta}{a})\cos\phi. \tag{88}$$

Comparison of equations 30 and 88 allows us to make the following association $$f(z) = 4n_o^2 g(\Delta/a). \tag{89}$$

The actual displacement of the fiber axis from perfect straightness can be expressed as, $$g = B\sin[\Omega z + \psi(z)] \tag{90}$$

with B being the displacement amplitude. Comparison of equations 79, 89 and 90 allows us to use the relation $$B = (aA/4n_o^2\Delta. \tag{91}$$

For our example values, equation 21, we thus obtain from equation 83

$$B = 2.9 \times 10^{-3} \mu m. \tag{92}$$

Figure 10:
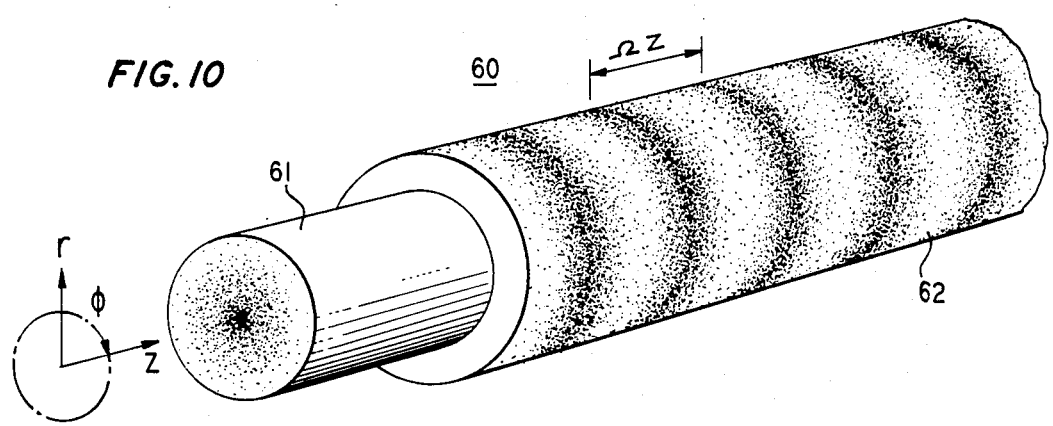
FIG. 10 is an isometric view of a fiber according to the invention having a periodically stressed, plastic jacket formed therearound.

The above discussion led to the discovery that one may introduce the desired perturbation by actually bending the fiber axis according to the relationship indicated by equation 90 with the very small amplitude B. Such bending could be accomplished by surrounding the fiber with a suitably strained plastic jacket. This is shown in FIG. 10 where waveguide 60 comprises an optical fiber 61 surrounded by a plastic jacket 62. Although very difficult to depict in the drawing, plastic jacket 61 is shaded to represent a jacket having a permanent sinusoidal strain of amplitude B and period $\Omega$ Z, as required by equation 90.

Figure 4C:
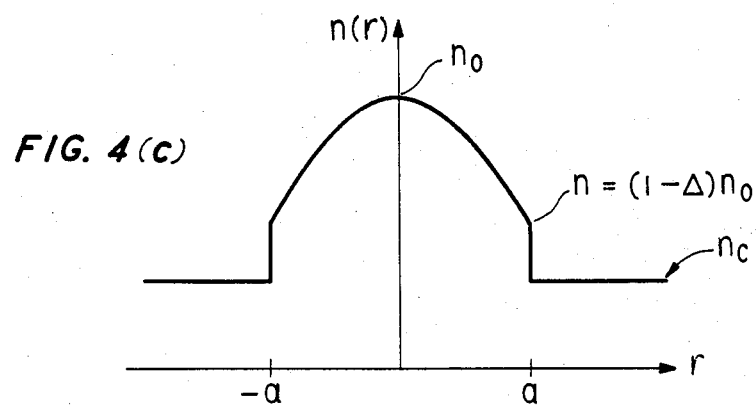
FIG. 4(c) is a graph showing the index gradient in a fiber according to the invention.
Figure 5:
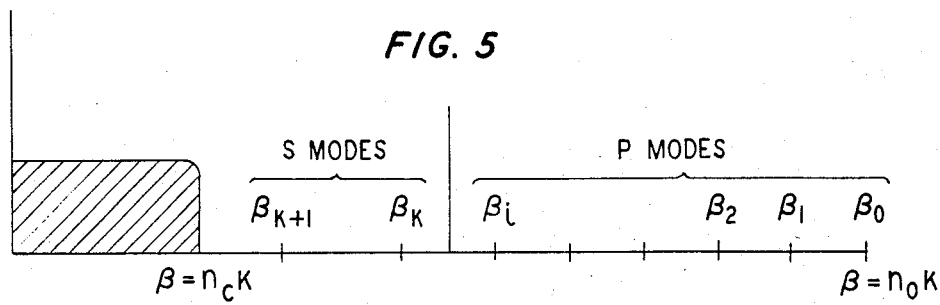
FIG. 5 is a phase constant diagram for a fiber having the index profile shown in FIG. 4(c)

Also difficult to show in the drawing, optical fiber 61 is shaded to represent a fiber having a radial index gradient in the core according to equation 5, that is to say, a fiber having an index gradient of the form shown in FIG. 4(c).

The abrupt refractive index discontinuity of magnitude $n_o(1-\Delta) - n_c$ is necessary to insulate the P-modes from the radiating modes by creating a buffer region of S-modes. The amount of this index step is actually quite arbitrary. However, it is clear from the general formula for the signal-to-noise ratio, equation 65, that the sum over n in the denominator of this expression is larger when it consists of more terms, that is to say, if there are more S-modes. To keep the signal-to-noise ratio as small as possible requires keeping the number of S-modes small, which is achieved by keeping the abrupt index discontinuity small. The question then becomes—what is the minimum index step that is needed for effective isolation of the P-modes? It is possible to estimate a minimum index step by the following consideration. The lowest possible value of the propagation constant of the P-modes is given by, $$\beta_m = n_o(1-\Delta)k. \quad (93)$$

The largest propagation constant of the radiating modes (actually, what are referred to here as radiating modes become cladding modes in a fiber with finite cladding thickness), is given by $$\beta_r = n_c k. \quad (94)$$

Adjacent groups of P-modes with the same value M of the compound mode number are spaced a distance $\theta$ (in $\beta$-space) apart. A sufficiently wide buffer zone of S-modes is required to isolate the P-modes from radiating modes. Thus, we require that the P-mode group with the propagation constant given by equation 93 is separated (in $\beta$-space) by $3\theta$ from the radiating modes. This requirement leads us to the desired condition for the minimum height of the index step, namely $$n_o(1-\Delta) - n_c = 3\theta/k = 3(\sqrt{2\Delta}/ka). \quad (95)$$

For the values listed in (21) we find $n_o(1-\Delta) - n_c = 0.003$.

It only remains to consider the design of the mode filters. As previously discussed, the mode filters may advantageously consist of fiber sections with a refractive index distribution according to FIG. 4(b). The mode filters serve the purpose of stripping-off the S-modes. The length of a filter section depends on the S-mode loss of the filter. Since S-modes are leaky waves on a filter section, the losses are very high; thus, filters of from 10 cm to 1 m in length should be sufficient. We have seen that the signal-to-noise ratio, equation 66, increases as the distance d between mode filters decreases. The only limitation on the length of d, or the number of mode filters L/d is the additional loss caused by the filters. If we decide that we can safely tolerate an additional filter loss of 1 db/km ($2\alpha_f = 0.23$ km$^{-1}$) for the entire fiber, we find from equation 74, with the data of equation 21

$$d = 0.47 \ km. \quad (96)$$

If the filter spacing is reduced below this distance, the filter loss contributions increases above 1 db/km.

The signal-to-noise ratio that is caused by unintentional coupling between P-modes and S-modes can be computed from equation 66 if a calibration measurement has been made. In principle, it would be possible to compute this value from equation 65; however, such a calculation would require a detailed knowledge of the unintentional power coupling coefficients $H_{\nu n}$. In the absence of accurate information on unintentional fiber imperfections, such a calculation is not possible.

Instead of using discrete mode filters spaced at certain intervals it is also possible to design the fiber so that mode filtering is achieved continuously over its entire length by means of electromagnetic tunneling. The index profile of such a fiber is shown in FIG. 11.

As can be seen, the index of such a fiber falls from its maximum value, $n_o$ at the axis, to the value $n = n_o(1-\Delta)$ at r=a, according to a parabolic (or nearly parabolic) relationship. This is followed by a step index change from n to $n_c$, which level is then maintained from r=a to r=a', followed by another step index change from $n_c$ back to n for r≧a'.

Figure 11:
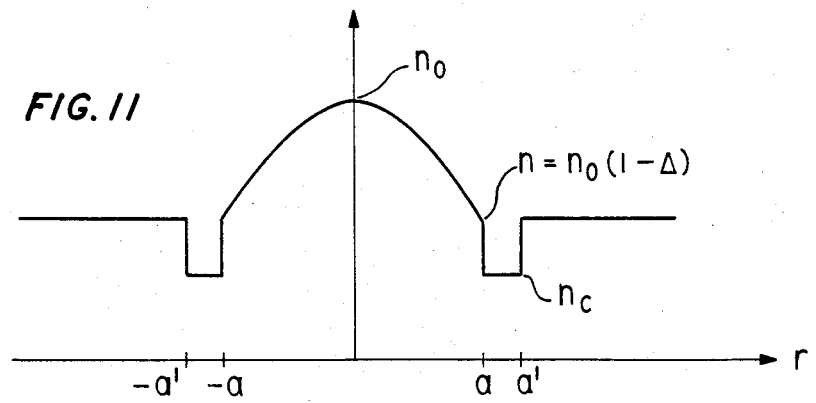
FIG. 11 is a graph showing the index profile of an alternate embodiment of the invention wherein continuous mode filtering is provided.

Optical fibers having index profiles according to FIG. 4(c) and FIG. 11 may be made by any of several known techniques including the so-called chemical vapor deposition techniques disclosed in U.S. Pat. Nos. 3,711,262, 3,737,292, and 3,737,293. More advantageously, the fibers may be made by means of the modified chemical vapor deposition technique disclosed in the commonly-assigned, copending application of MacChesney-O'connor, Case 9-4, Ser. No. 444,705, filed Feb. 22, 1974, now abandoned.

Considering first the profile shown in FIG. 4(c), if the MacChesney-O'Connor process is used, the dopant in the glass-forming precursor is gradually reduced to reduce the index of the core, according to the desired index profile. At r=a, the dopant is suddenly reduced to some lower value and then maintained at that lower level to build-up the cladding layer. On the other hand, if a fiber having the profile shown in FIG. 11 is desired, the amount of dopant in the glass-forming precursor is suddenly increased in value at r=a' and then maintained constant at that increased value to build-up the desired cladding layer.

One skilled in the art will appreciate that many changes and substitutions may be made to the fiber shown without departing from the spirit and scope of the invention. It must be emphasized that the invention is not limited to optical fibers having parabolic or square-law index profiles. The invention is intended to encompass variations from the classic parabolic index profile, for example the modified profile discussed in commonly-assigned U.S. Pat. No. 3,823,997, which issued on July 16, 1974 to D. C. Gloge and E. A. J. Marcatili and the term "graded index", as used in the specification and claims, is intended to encompass all such index profiles including parabolic, near parabolic and non-parabolic index gradients.

What is claimed is:

1. A multimode graded-index optical fiber waveguide comprising, in combination, a central core region, a cladding region radially surrounding and forming a boundary with the core region, the core region having a refractive index which continually decreases in a radially outward direction from a maximum value on the fiber axis, the waveguide being normally supportive of optical wave propagation in a first group of guided modes having a field distribution substantially confined within the core region and in a second group of radiating modes having phase constants less than the modes of the first group, the refractive index of the waveguide exhibiting a discrete predetermined decrease in a radially outward direction across the boundary of the core region and the cladding region to effect the generation of a third set of guided modes having a field distribution that extends significantly into the cladding region, the phase constants of the third group of modes being intermediate those of the first group and the second group to effectively isolate the modes in the first group from those in the second group, and means for selectively effecting mode conversion among the so-isolated first modes, said mode conversion effecting means comprising means for introducing periodic perturbations in the axial direction of the waveguide.

2. In a multimode graded-index optical fiber waveguide, a first waveguide section comprising, in combination, a first central core region, a second cladding region radially surrounding and forming a boundary with the first core region, the first core region having a refractive index which continually decreases in a radially outward direction from a maximum value on the fiber axis, the first waveguide section being normally supportive of optical wave propagation in a first group of guided modes having a field distribution substantially confined within the first core region and in a second group of radiating modes having phase constants less than the modes of the first group, the refractive index of the first waveguide section exhibiting a discrete predetermined decrease in a radially outward direction across the boundary of the first core region and the second cladding region to effect the generation of a third set of guided modes having a field distribution that extends significantly into the second cladding region, the phase constants of the third mode group being intermediate those of the first group and the second group to effectively isolate the modes in the first group from those in the second group, and means for selectively effecting mode conversion only among the so-isolated first modes.

3. A waveguide as defined in claim 2, in which the mode conversion effecting means comprises means for introducing periodic perturbations in the axial direction of the first waveguide section.

4. A waveguide as defined in claim 3, in which the perturbation introducing means comprises a prestressed insulating jacket radially surrounding the second cladding region, the wall of the jacket exhibiting a periodic axial undulation.

5. A waveguide as defined in claim 2, further comprising means associated with the first waveguide section for exhibiting propagation of the third mode group.

6. A waveguide as defined in claim 5, in which the propagation inhibiting means comprises a second optical waveguide section axially abutting the first waveguide section, the second waveguide section comprising, in combination, a second central core region and a third cladding region radially surrounding and forming a boundary with the second core region, the refractive index of the second core region decreasing continually in a radially outward direction from a maximum value on the fiber axis, the refractive index of the second waveguide section being substantially continuous across the boundary of the second core region and the third cladding region.

7. A waveguide as defined in claim 5, in which the propagation inhibiting means comprises a third cladding region radially surrounding and forming a boundary with the second cladding region, the refractive index of the first waveguide section exhibiting a discrete predetermined increase in a radially outward direction across the boundary of the second and third cladding regions.

8. A waveguide as defined in claim 7, in which the discrete increase of refractive index across the boundary of the second and third cladding layers is substantially equal to the discrete decrease of refractive index across the boundary of the first core region and the second cladding region.

* * * * *